J. J. SERRELL.
FLEXIBLE COUPLING.
APPLICATION FILED AUG. 29, 1918.
1,290,370.
Patented Jan. 7, 1919.
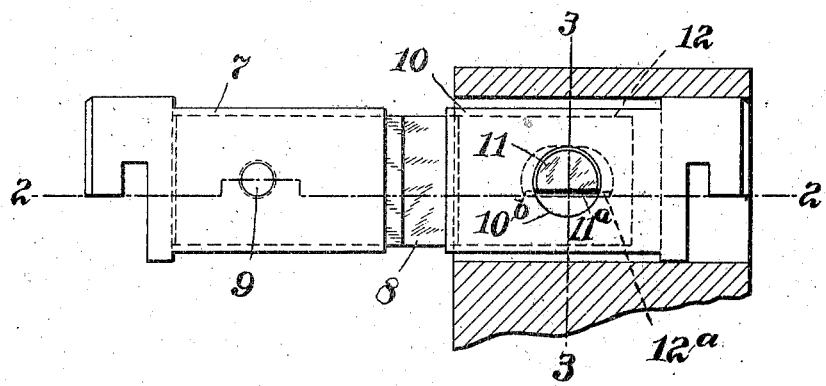
Fig. 1.
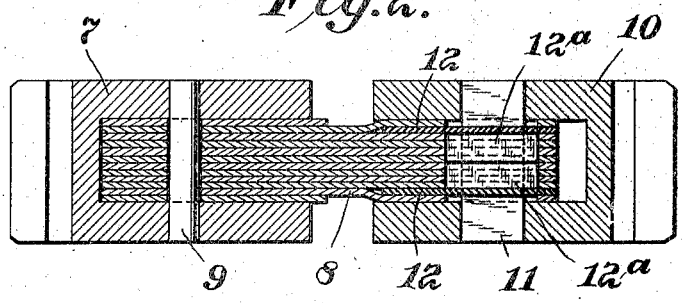
Fig. 2.
Fig. 3.     Fig. 5.     Fig. 4.
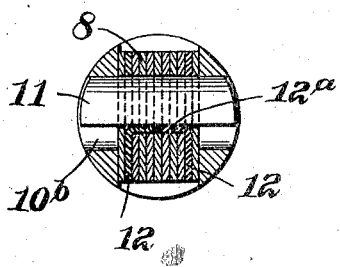 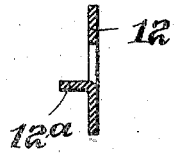 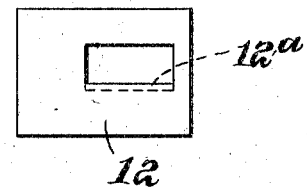
Fig. 6.
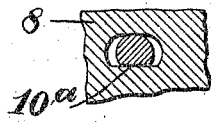
Inventor:
John J. Serrell,
by Middleton Donaldson & Spear
Atty's

UNITED STATES PATENT OFFICE.

JOHN J. SERRELL, OF ELIZABETH, NEW JERSEY.

FLEXIBLE COUPLING.

1,290,370.  Specification of Letters Patent.  Patented Jan. 7, 1919.

Application filed August 29, 1918. Serial No. 251,986.

*To all whom it may concern:*

Be it known that I, JOHN J. SERRELL, a citizen of the United States, and resident of Elizabeth, New Jersey, have invented certain new and useful Improvements in Flexible Couplings, of which the following is a specification.

My present invention relates to improvements in flexible couplings of the type shown in Letters Patent of the United States granted to R. A. Smith, December 28th, 1915, and numbered 1,165,551.

I have found that considerable trouble has been experienced with this coupling, especially at high speed, due to the centrifugal action on the springs, which tends to throw them outwardly away from the center of the shaft or axis of rotation and produce excessive pressure on the line contact between the rounded surface of the pin and the wall of the slot in the sliding end of the bundle of springs.

The object of the present invention is to provide an improved construction, which will be free from the troubles due to this line contact, and the invention includes the novel features of construction and arrangement and combination of parts hereinafter described and particularly defined by the appended claims.

An embodiment of my invention is illustrated in the accompanying drawings, in which, Figure 1 is an elevation, partly in section of a sufficient portion of a coupling to disclose my improvements.

Fig. 2 is a longitudinal section on line 2—2 of Fig. 1.

Fig. 3 is a transverse section on line 3—3 of Fig. 1.

Figs. 4 and 5 are respectively a side elevation and a section of one of the spaces pieces, and Fig. 6 is a sectional detail.

Referring by reference numerals to this drawing the numeral 7 designates the keeper at one end having the bundle of springs 8 non-slidably held in the recess thereof by a rounded cross pin 9, accurately fitting a round hole in the walls of the keeper and the bundle of springs. 10 designates the opposite keeper which has a recess in which the opposite end of the bundle of springs is slidably held. To avoid any line contact between the pin and the bundle of springs I provide a pin 11 having a flat under side 11$^a$ which affords a broad surface contact between the inner side or face of the pin which is toward the axis of rotation of the coupling, and the inner wall of the slot in the bundle of springs. The slot preferably conforms in shape to the pin, that is, the ends of the slot are in the form of quarter (or 5/16) circles as shown.

To maintain true surface contact at all times one method is shown wherein the half (or 5/8) round or cylindrical portion of the ends of the keeper cross pin, as indicated at 10$^b$, are seated in cylindrical openings in the keeper and are free to turn therein, so as to cause the flat portion 11$^a$ of the pin to be self adjusting with relation to the corresponding wall of the slot.

To further improve the sliding contact I provide the spacer pieces 12 with tongues 12$^a$ cut from the body of the metal which are bent over at right angles and abut against each other and overlie the edges of the springs forming the wall of the slot. This provides a smooth bearing surface for the flat face of the pin and avoids the necessity of having the said flat face bear against the laminations of the spring bundle.

The cutout portions in the spacer plates form a passage for the pin.

What I claim is:

1. In a flexible pin a keeper, a set of superimposed leaf springs having their ends seated in said keeper, and having an elongated slot, and a pin having a flat face bearing against the inner wall of the slot.

2. In a flexible pin a keeper, a set of superimposed leaf springs having their ends seated in said keeper, and having an elongated slot, and a pin having a flat face bearing against the inner wall of the slot, said pin being rotatably held with respect to said keeper.

3. In a flexible pin a keeper, a bundle of springs slidably held in said keeper and having an elongated slot, a pin having part cylindrical ends seated in corresponding recesses in the keeper, said pin having the flat portion coacting with the wall of the slot in the bundle of springs.

4. In a flexible pin a keeper, a bundle of springs slidably held in said keeper and having a transverse slot, a spacer plate coöperating with said bundle of springs, said spacer plate having a laterally turned tongue overlying the wall of the slot, and a pin passing through the slot and having a flat surface bearing against said laterally turned tongue.

5. In a flexible pin a keeper, a bundle of springs slidably held in said keeper and having a transverse slot, spacer plates at each side of said bundle of springs having integral tongues bent toward each other and overlying the wall of the slot, and a keeper pin passing through the slot.

In testimony whereof I affix my signature.

JOHN J. SERRELL.